United States Patent [19]

Tan et al.

[11] Patent Number: 4,975,556
[45] Date of Patent: Dec. 4, 1990

[54] BUTT WELDING MACHINE

[75] Inventors: Archie Tan, Wilmette; Vernon R. Fencl, Northbrook, both of Ill.

[73] Assignee: Grotnes Metalforming Systems, Inc., Chicago, Ill.

[21] Appl. No.: 285,591

[22] Filed: Dec. 16, 1988

[51] Int. Cl.⁵ .............................................. B23K 11/02
[52] U.S. Cl. .................................... 219/101; 219/61.1
[58] Field of Search .................... 219/59.1, 61.1, 61.13, 219/101, 102

[56] References Cited

U.S. PATENT DOCUMENTS

| | | | |
|---|---|---|---|
| 4,110,577 | 8/1978 | Spisak | 219/101 |
| 4,187,406 | 2/1980 | Fend et al. | 219/59.1 |
| 4,562,326 | 12/1985 | Tan et al. | 219/59.1 |
| 4,649,253 | 3/1987 | Zollinger | 219/59.1 |

Primary Examiner—A. D. Pellinen
Assistant Examiner—Geoffrey S. Evans
Attorney, Agent, or Firm—Marshall, O'Toole, Gerstein, Murray & Bicknell

[57] ABSTRACT

A cylindrical wheel rim blank has a longitudinal seam defined by a pair of longitudinal edge portions each of which is clamped between upper and lower jaws of a respective clamping assembly. The two clamping assemblies are urged laterally together to press the two longitudinal edge portions together, and welding current is introduced at the seam through the lower jaws to effect the weld. The upper jaws are at the bottom of cantilevered horn members around which the rim blank is mounted. The lower jaws are urged upwardly toward the cantilevered upper jaws to effect the clamping function. Structure is provided to equalize the clamping pressure exerted against the upper jaw along the length thereof and, if desired, to introduce a bias into the upward pressure exerted through the lower jaw. There is a mechanism to provide different, predetermined spacings between the clamping assemblies as different steps in the operation. Circuitry is provided to produce a reversing, pulsating DC welding current.

23 Claims, 10 Drawing Sheets

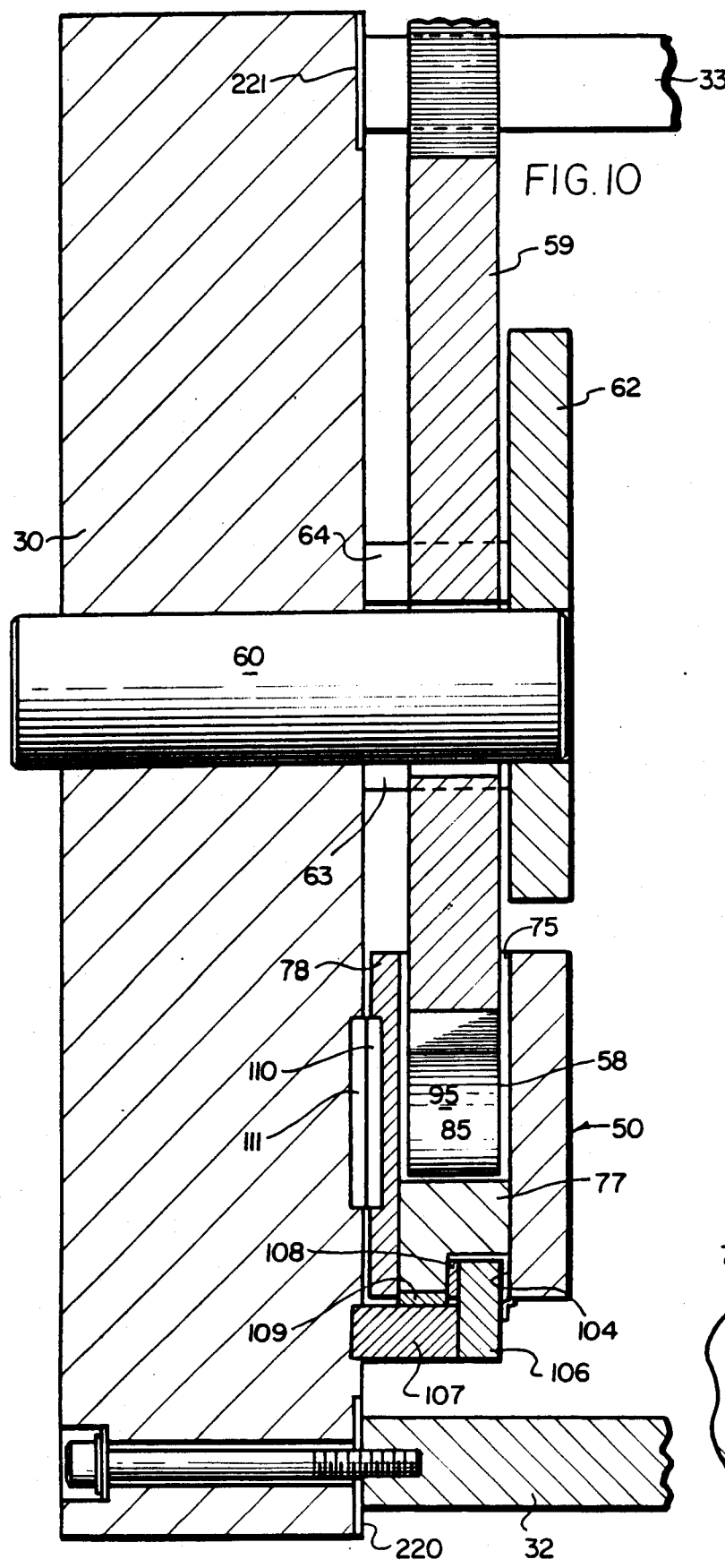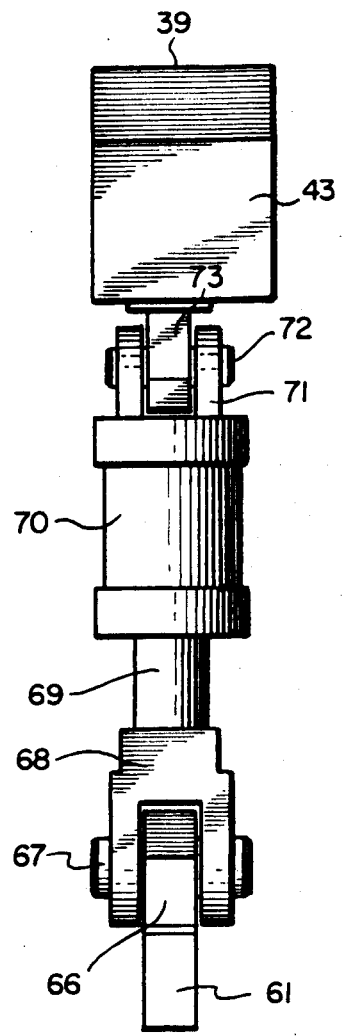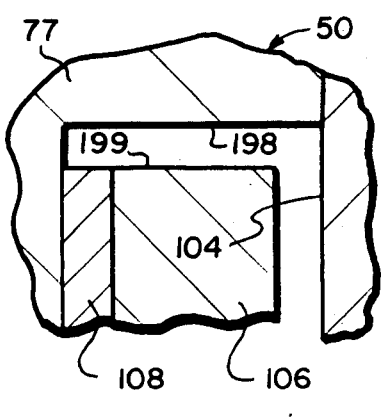

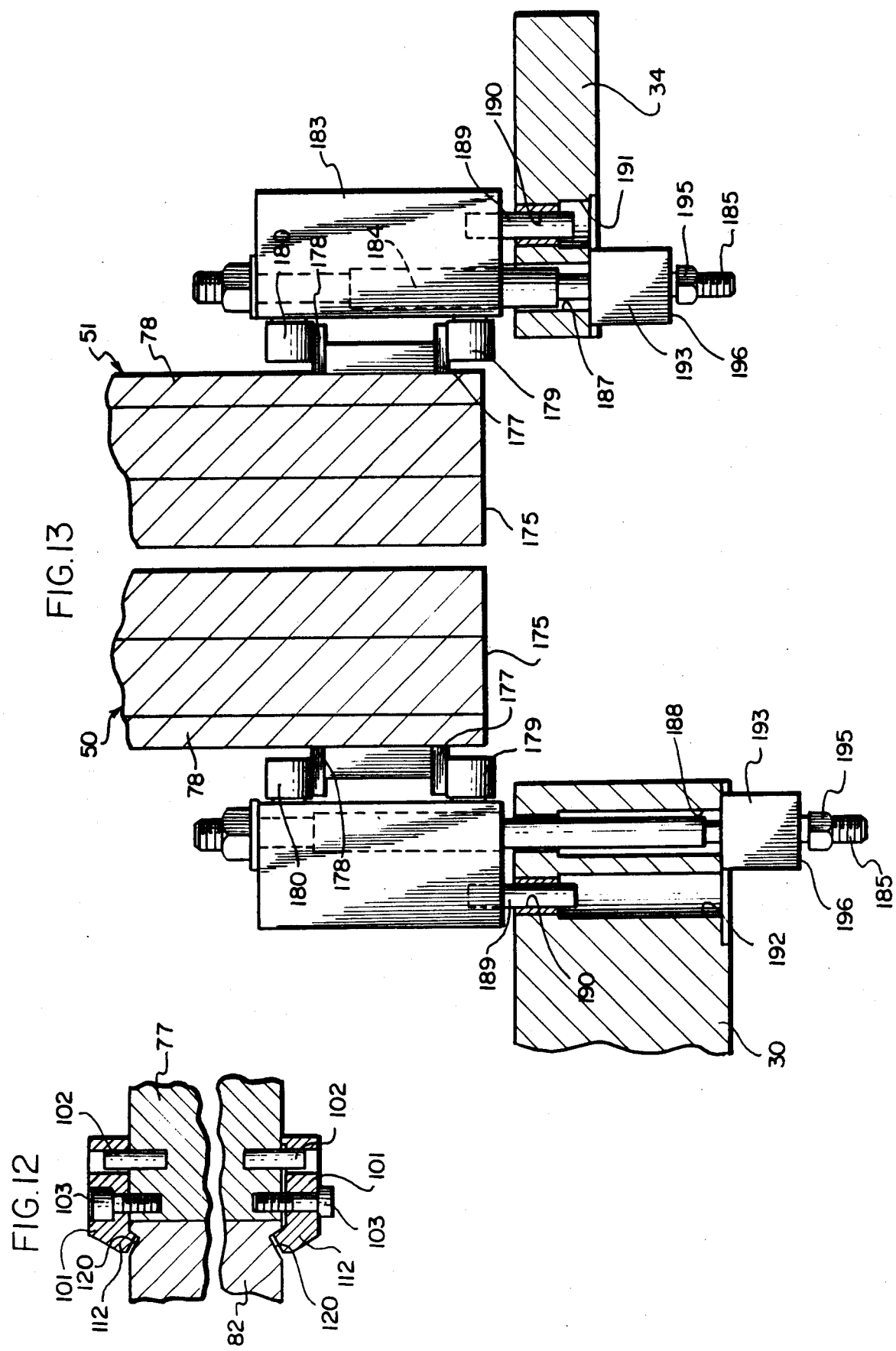

BUTT WELDING MACHINE

BACKGROUND OF THE INVENTION

The present invention relates generally to butt welding machines and more particularly to machines for butt welding together a pair of laterally spaced apart, parallel, longitudinal edge portions such as are found at the longitudinal seam of an automotive wheel rim blank formed from a strip of metal which has been rolled into a cylinder.

Typically, the longitudinal edge portions of a rim blank are clamped between the inside and outside jaws of a respective one of a pair of laterally spaced clamping assemblies located on opposite sides of a weld zone which extends along the rim blank's longitudinal seam. When the rim blank is first clamped, its longitudinal edges are spaced laterally from each other. The clamped edges are then pressed laterally together along the longitudinal seam and, while lateral pressure is being applied to the edges, an electric welding current is passed through the clamping assemblies and the rim blank to butt weld the longitudinal edges to one another as they undergo an upsetting deformation.

A butt welding machine for performing the operation described in the preceding paragraph is described in Tan, et al., U.S. Pat. No. 4,562,326 ('326) entitled "Machine for Welding Automotive Wheel Rim Blanks", and the disclosure thereof is incorporated herein by reference.

In the butt welding machine of Tan, et al. '326, the rim blank is supported by a pair of horizontally extending, cantilevered horn members, each having an unsupported end. A stationary inner or upper jaw is located on the bottom of each cantilevered horn member. This upper jaw has an engaging surface for engaging the inner or upper surface of one of the longitudinal edge portions which undergoes welding. The upper jaw has first and second jaw ends, and the engaging surface of the jaw extends between the first and second jaw ends in the same direction as the cantilevered horn member. The machine also includes an outer or lower jaw for clampingly mating with each of the two upper jaws. Each lower jaw engages the outer or lower surface of a longitudinal edge portion which undergoes welding.

There is a vertically disposed slide member mounting each lower jaw for sliding, vertical movement toward and away from a corresponding upper jaw in a clamping assembly, to effectuate the clamping operation. In addition, one of the two cantilevered horn members and the slide member associated with that horn member are mounted for pivotal movement about a horizontal axis to urge the two jaws in that clamping assembly laterally toward the two jaws in the other clamping assembly, to effectuate the lateral pressure on the two longitudinal edges undergoing butt welding.

Because each horn member is cantilevered and because the upward movement of a slide member exerts an upward pressure on the cantilevered horn member all the way out to its unsupported end, there is a tendency for the unsupported end to be deflected upwardly relative to the fixed end of the cantilevered horn member. The upper jaw carried by the horn member is similarly deflected, with the horn member.

Each longitudinal edge portion of a rim blank is clamped between upper and lower jaws during welding. As a result of the deflection described above, there can be an inequality in clamping pressure along the longitudinal edge portion, from the front end to the rear end thereof. This is undesirable because such inequalities in clamping pressure produce inequalities in welding current from the front end to the rear end of the longitudinal edge portion, whereas a uniform distribution of welding current is desired.

The machine of Tan, et al. '326 employs a screw-down arrangement to try to cope with this problem. Although that screw-down arrangement helps to overcome the problem of non-uniform welding current distribution, it would be desirable to employ a solution other than a screw-down arrangement.

There may be times when it is desirable to exert a non-uniform clamping pressure along a rim blank's longitudinal edge portion from the front end to the rear end thereof. This would occur when there are surface irregularities, the adverse effects of which can be overcome by applying non-uniform pressure at localized spots along the length of the longitudinal edge portion.

Each cantilevered horn member is located near the front of the machine and extends in a frontward direction from the front end of a massive mounting member having a rear end located near the rear of the machine. In the machine of Tan, et al. '326, welding current is supplied to each of the upper jaws on a respective cantilevered horn member, by bus bars each extending the length of a horn member and its respective mounting member. Current flows from the rear end of one mounting member to the unsupported end of the corresponding horn member, through the corresponding upper jaw, through the rim blank, across the seam undergoing welding, through the upper jaw on the other horn member and then back through the other horn member from its unsupported end to the rear end of the associated mounting member. As a result, current flows in two opposite, parallel directions, through the respective horn members and associated mounting members. This produces mutually repelling magnetic fields around each of the two horn members and associated mounting members, and the two cantilevered horn members and their associated mounting members tend to repel each other laterally. This is in contrast to what occurs during a butt welding operation in which one of the two cantilevered horn members and its mounting member are urged in a lateral direction toward the other horn member and mounting member by a lateral force exerted primarily at the front end of the machine. The end result is that, during a butt welding operation, the one horn member and its mounting member are subjected to a horizontal bending force along the length thereof, and this is undesirable because the bending force is exerted at least in part along the length of the upper jaw on that horn member, from the front end to the rear end of the jaw.

In a butt welding operation in accordance with Tan, et al. '326, the rim blank is mounted around the two cantilevered horn members using a loading tool which is inserted into the seam between the two longitudinal edge portions of the rim blank. This enables accurate alignment and initial lateral spacing of the two longitudinal edge portions within and between the clamping assemblies. To facilitate the employment of the loading tool and to assure that each clamping assembly is aligned with a respective longitudinal edge portion at the spacing defined by the loading tool, it is desirable that each clamping assembly be initially spaced apart laterally from the other clamping assembly by a predetermined, fixed distance. Then, after both longitudinal edge portions of the rim blank have been clampingly engaged, it is desirable that the two clamping assemblies be spaced apart laterally a greater, predetermined, fixed distance, to facilitate the removal of the loading tool; however, this latter distance must not be too great, to avoid adversely deforming the rim blank by spreading it apart at the seam.

SUMMARY OF THE INVENTION

A butt welding machine in accordance with the present invention incorporates a number of features constituting improvements over the butt welding machine of the Tan, et al. '326 patent.

The present invention eliminates the screw-down arrangement employed by Tan, et al. '326 to overcome the upward deflection at the unsupported end of a cantilevered horn member, resulting from the upward pressure occurring during a clamping operation. Instead, the present invention utilizes a floating linkage between (a) the vertically movable slide member and (b) a movably mounted lever element which raises and lowers the slide member. As noted above, the upper jaw of a clamping assembly is mounted on the bottom of a cantilevered horn member. The floating linkage equalizes the upwardly directed pressure exerted against the engaging surface of the cantilevered upper jaw, between the front and rear ends of the upper jaw. This avoids the problem of upward deflection at the free, unsupported end of the cantilevered horn member.

A butt welding machine in accordance with the present invention also includes structure for enabling the introduction of a bias into the force exerted through the lower jaw, along the dimension of the lower jaw between its front and rear ends. This enables one to overcome the adverse effects which would otherwise result from surface irregularities at localized spots along the longitudinal edge portion of the rim blank undergoing welding.

In a butt welding machine in accordance with the present invention, no cantilevered horn member is subjected to horizontal bending forces. This is because there are no opposing magnetic fields associated with each of the cantilevered horn members and their respective mounting members. Unlike the welding machine of Tan, et al. '326, a welding machine in accordance with the present invention does not employ bus bars running the length of the horn members and their mounting members. Instead, the bus bars are located below the lower ends of the vertically movable slide members. Each slide member comprises a vertically disposed conductor. Each such conductor has an upper end connected to a welding electrode constituting the lower jaw carried at the top of the slide member, and a lower end connected to a bus bar.

The welding current runs up one conductor, through the associated lower jaw, through the rim blank, across the seam, through the other lower jaw and then down through the other conductor. There are no horizontal bending forces along the length of any jaw, between its front and rear ends. To the extent that opposing magnetic fields create a mutual repulsion, in a lateral direction, that occurs along the vertical dimension of the movable slide members, a location where it is more tolerable.

To accommodate the electrical connection between a bus bar and a vertically disposed conductor during vertical movement of the conductor, a welding machine in accordance with the present invention includes a pair of flexible connector members, each electrically connecting the lower end of a respective conductor to a respective bus bar. Each of the flexible connector members flexes to accommodate vertical movement of the associated conductor, at the same time maintaining the electrical connection between the conductor and its corresponding bus bar.

A butt welding machine in accordance with the present invention also includes a mechanism which facilitates the insertion and removal, between laterally spaced apart clamping assemblies, of the rim blank's loading tool. This mechanism permits one to fix the horizontal or lateral spacing between the two clamping assemblies, one of which is mounted for lateral movement toward and away from the other. The mechanism comprises a horizontally disposed, fluid actuated piston, a cylinder enclosing the piston, and a linkage between the piston and the laterally movable clamping assembly. The linkage comprises a first stop structure for halting the movement of the piston when the two clamping assemblies are spaced apart a first predetermined, fixed distance. This spacing readily permits the insertion between the two clamping assemblies of the loading tool, with associated rim blank held thereon. This spacing also aligns each clamping assembly with a respective longitudinal edge portion at the spacing defined by the loading tool.

The linkage also includes a second stop structure, actuable after the rim blank has been clamped, for halting the movement of the piston when the two clamping assemblies are spaced apart a second predetermined, fixed distance greater than the first predetermined distance. At this second spacing, the loading tool may be readily removed from between the longitudinal edge portions defining the seam of the rim blank. After the loading tool has been removed, the piston is actuated to urge the two longitudinal edge portions laterally together.

A butt welding machine in accordance with the present invention also enables the utilization of a pulsating DC current in an effective manner as the welding current.

Other features and advantages are inherent in the butt welding machine claimed and disclosed or will become apparent to those skilled in the art from the following detailed description in conjunction with the accompanying diagrammatic drawings.

BRIEF DESCRIPTION OF THE DRAWINGS

FIG. 10 is an enlarged sectional view taken along line 10—10 in FIG. 9;

FIG. 10a is an enlarged, fragmentary, sectional view constituting an enlargement of a portion of FIG. 10;

FIG. 11 is a rear view, of part of the machine, taken along line 11—11 in FIG. 10;

FIG. 12 is an enlarged, sectional view taken along line 12—12 in FIG. 6;

FIG. 13 is an enlarged, fragmentary, sectional view illustrating an adjusting mechanism included in the machine, as viewed from above;

DETAILED DESCRIPTION

Figure 3:
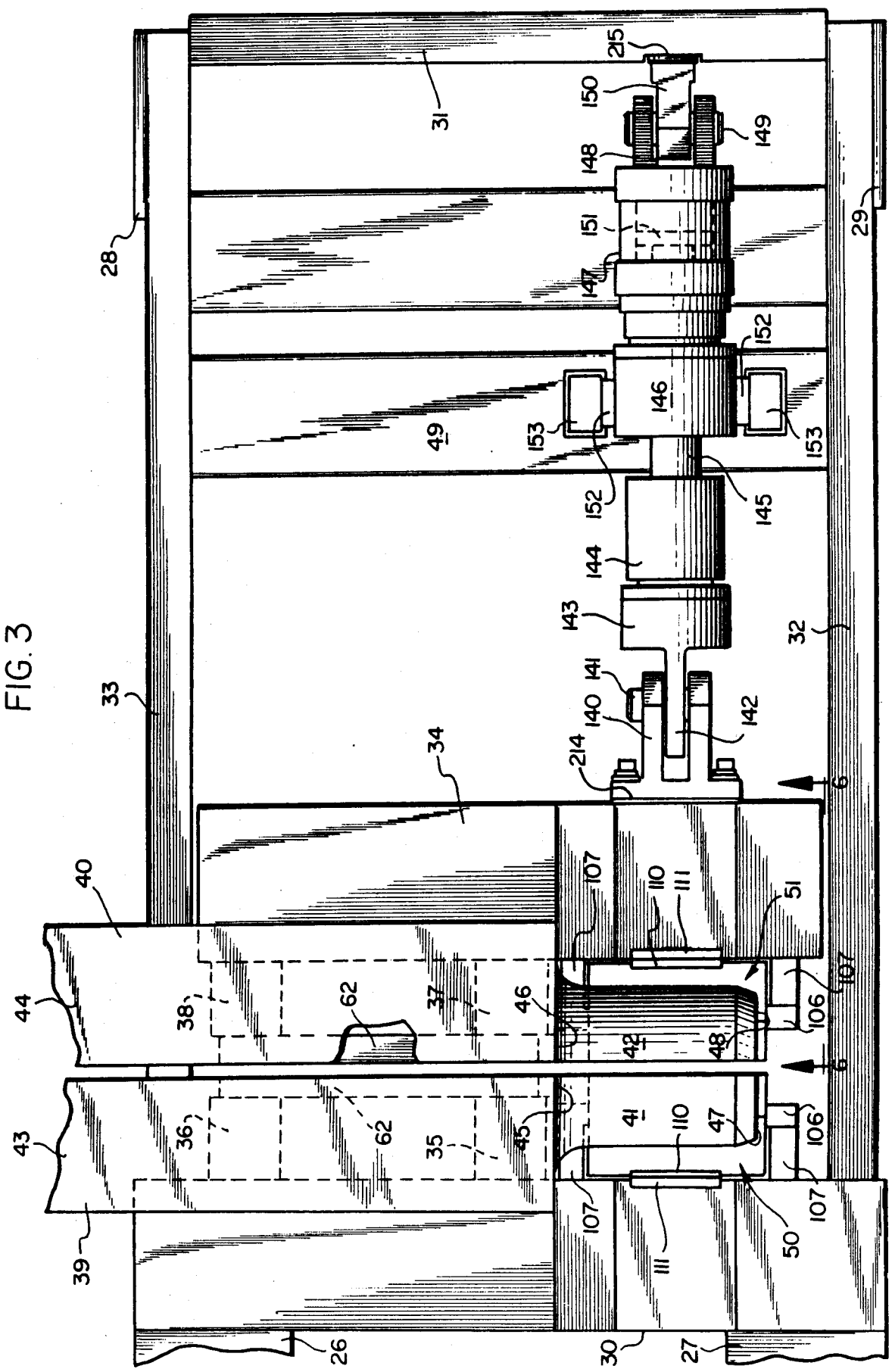
FIG. 3 is a plan view of an embodiment of a welding machine in accordance with the present invention.
Figure 4:
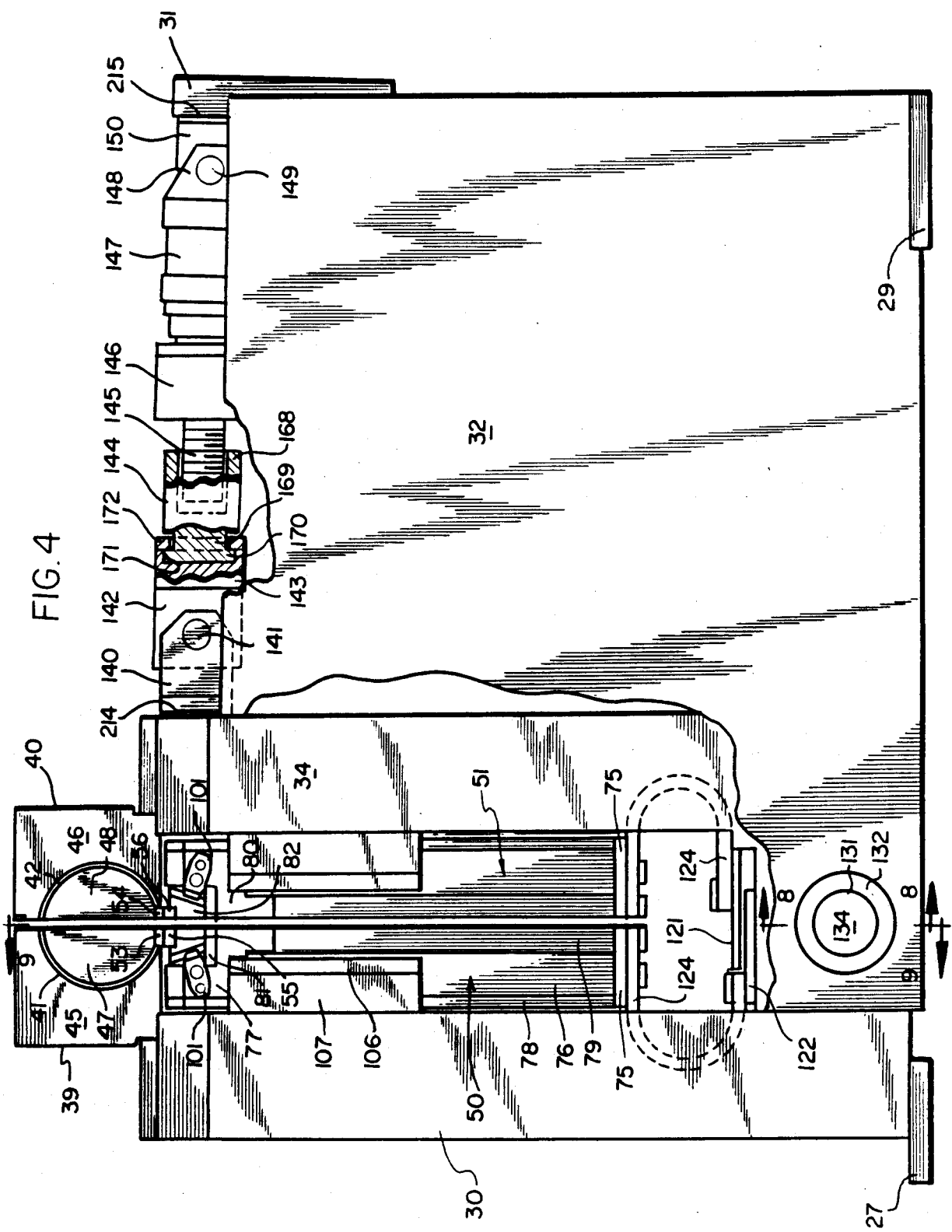
FIG. 4 is a front elevational view of the welding machine.
Figure 9:
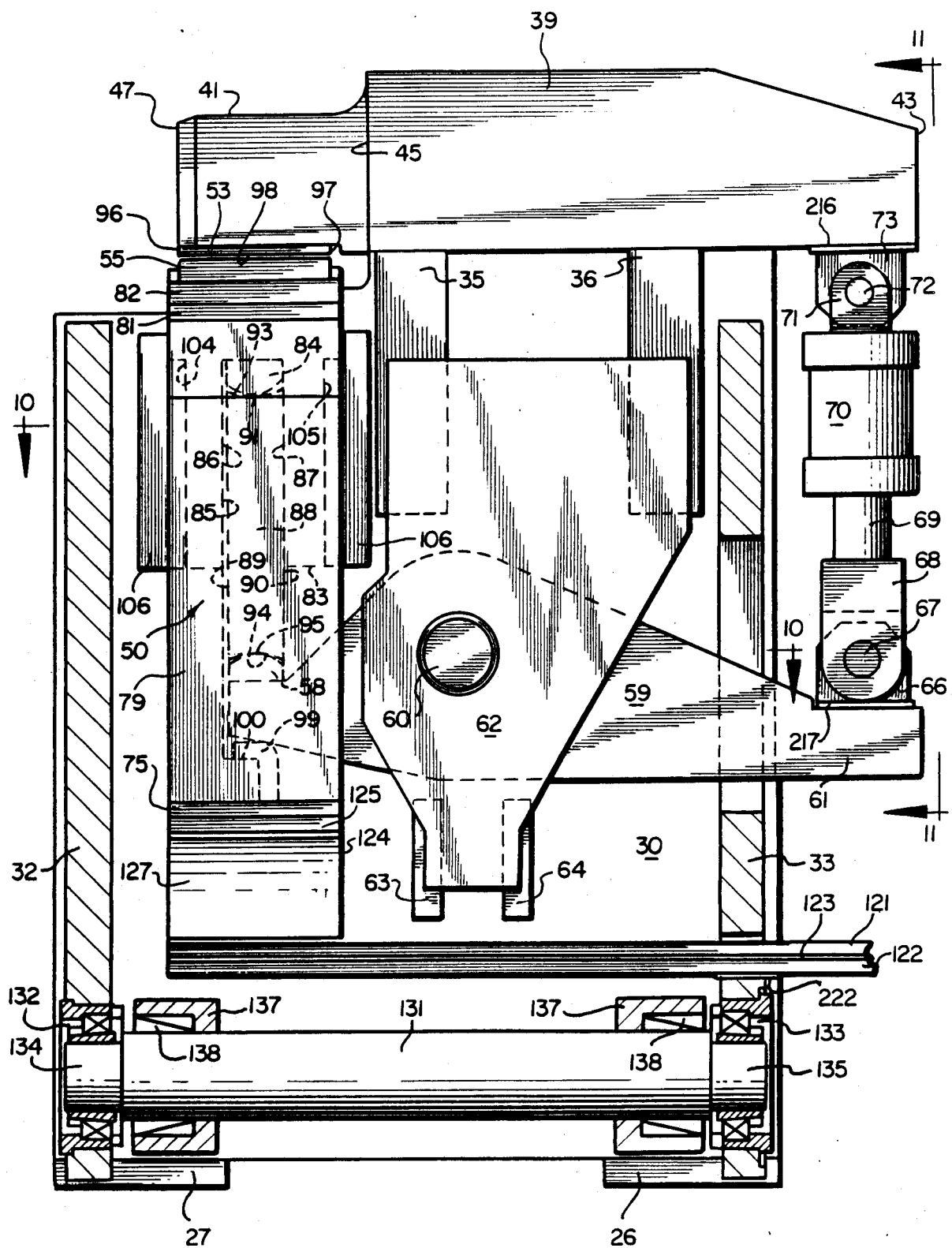
FIG. 9 is a sectional view taken along line 9—9 in FIG. 4.

Referring initially to FIGS. 3, 4 and 9, a welding machine in accordance with the present invention comprises a rectangular frame resting on corner floor pads 26,27,28,29. The rectangular frame comprises a pair of side frame members 30,31, a front plate 32 and a rear plate 33. Laterally spaced from side frame member 30, and extending between front plate 32 and rear plate 33, is a platen 34. Attached to the inside surface of side frame member 30 is a pair of upper support posts 35,36 (FIGS. 3 and 9). Attached to the inside surface of platen 34 is a similar pair of upper support posts 37,38 (FIG. 3).

Extending between the front and rear of the machine is a pair of relatively massive, elongated mounting members 39,40. Mounting member 39 is supported by side frame member 30 and support posts 35,36. Mounting member 40 is supported by platen 34 and support posts 37,38. Each mounting member 39,40 has a respective rear end 43,44 and front end 45,46. Extending from each front end is a cantilevered horn member 41,42 each having a respective free, unsupported end 47,48.

Located adjacent the inner surface of side frame member 30 is a vertically disposed slide member indicated generally at 50. Located adjacent the inner surface of platen 34 is a vertically disposed slide member indicated generally at 51. Slide members 50,51 are mounted for vertical sliding movement relative to side frame member 30 and platen 34 respectively, employing structure to be subsequently described.

Figure 19:
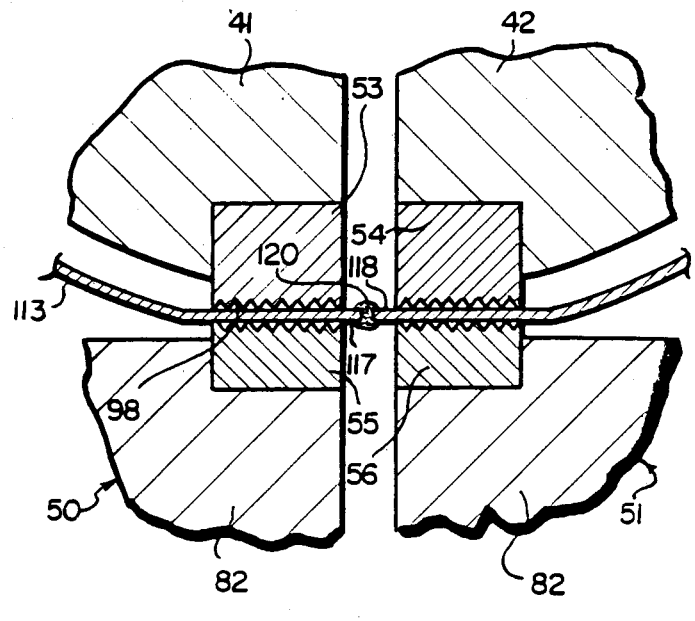
FIG. 19 is an enlarged, fragmentary, sectional view illustrating a welding operation on a rim blank, performed by the welding machine of the present invention.

Located on the bottom of cantilevered horn member 41 is a stationary upper jaw 53 forming part of a clamping assembly also including a lower jaw 55 carried by the upper portion of slide member 50. Carried on the bottom of cantilevered horn member 42 is a stationary upper jaw 54 forming part of a clamping assembly also including a lower jaw 56 carried on the upper portion of slide member 51. As shown in FIG. 19, a workpiece 113 is engaged between serrated engaging surfaces of upper and lower jaws 53,55 and 54,56. Welding current is supplied to the jaws in a manner to be described below.

Each lower jaw 55,56 is urged upwardly toward a respective upper jaw 53,54 in response to upward movement of a respective vertically disposed slide member 50,51. Each slide member is urged upwardly with structure now to be described, with reference to FIGS. 5, 9 and 10.

As shown in the drawings, slide member 50 is engaged internally by one end 58 of a lever 59 mounted for pivotal movement about the axis 60a of a pivot shaft 60 extending between side frame member 30 and an internal frame member 62 attached to upper support posts 35,36 and to a pair of lower support posts 63,64 in turn attached to the inner surface of side frame member 30 (FIGS. 9-10). Referring to FIGS. 9 and 11, lever 59 has another end 61 attached to a lower knuckle 66 connected by a pivot pin 67 to a lower clevis 68 in turn connected to a piston rod 69 attached to a piston located with a vertically disposed cylinder 70 the upper end of which is attached to an upper clevis 71 connected by a pivot pin 72 to an upper knuckle 73 attached to the bottom of the rear end 43 of mounting member 39.

The structure described in the preceding paragraph is associated with slide member 50 and side frame member 30. Slide member 51 is essentially identical to slide member 50 and is raised and lowered with similar structure and operating mechanisms, except that the elevating lever for slide member 51 is mounted between an internal frame member such as 62 and platen 34 rather than between an internal frame member and side frame 30 as is the case with slide member 50. Slide members 50,51 are in mutually facing relation. The structural details for these slide members will now be discussed with reference to FIGS. 5-7, 9 and 10.

Each slide member comprises a lower plate 75 upon which is mounted the lower portion 76 of a slide bar also having an upper portion 77. Also mounted on lower plate 75 are an outer plate 78 and an inner plate 79. Slide bar upper portion 77 has a projection 80 upon which is mounted an upper plate 81 upon which rests an electrode retainer 82 for carrying a welding electrode which, in the case of slide members 50,51, constitutes lower jaw 53 or 54.

Figure 5:
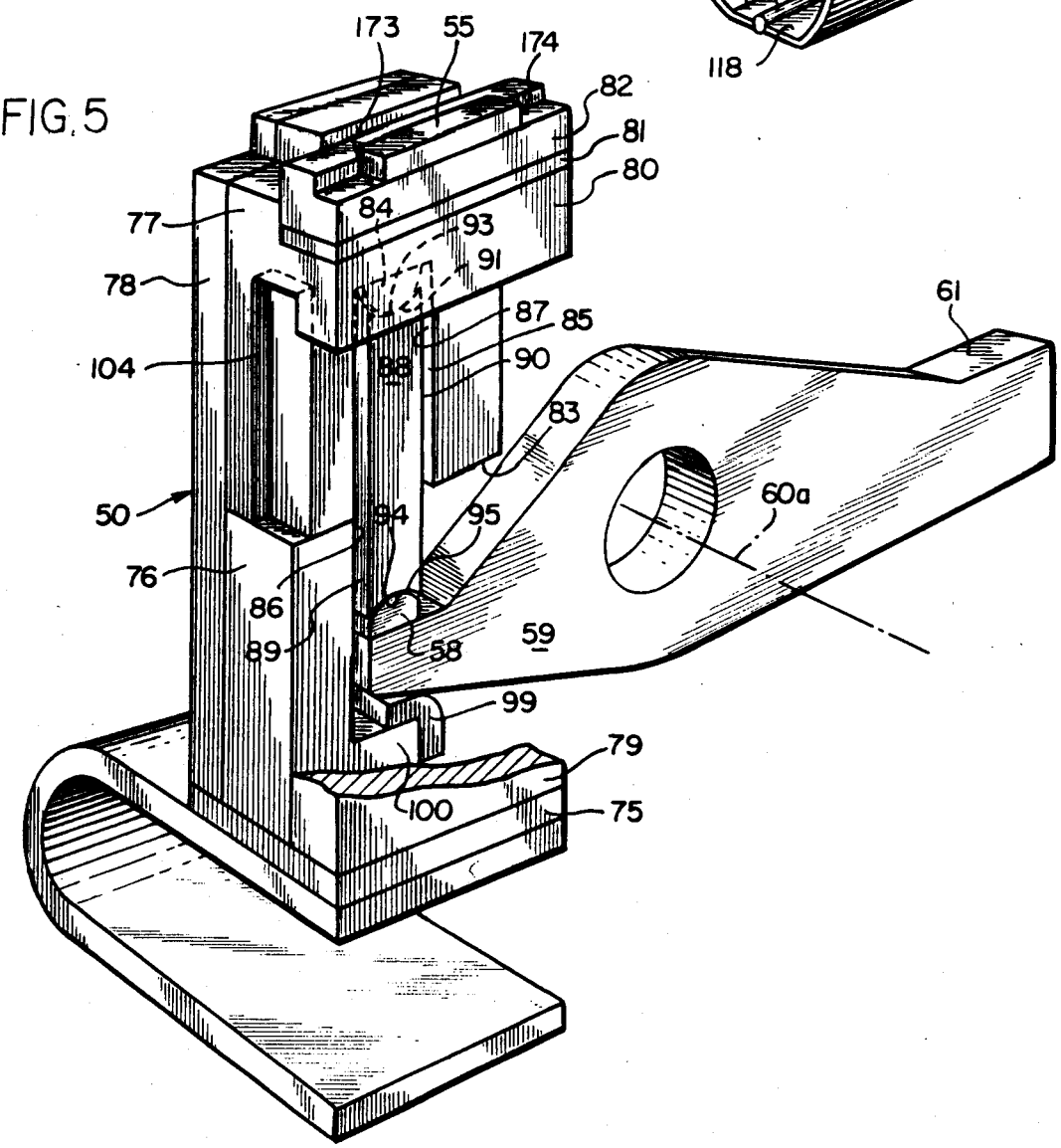
FIG. 5 (sheet No. 1) is a perspective of a vertically movable slide member and associated structure employed in the welding machine.

The slide bar defined by lower and upper bar portions 76 and 77 has a vertically disposed, elongated internal recess 85 having spaced apart sidewalls 86,87. Located in recess 85 is a vertically disposed, elongated floating member 88 having spaced apart side surfaces 89,90 (FIG. 5).

Recess 85 comprises structure for maintaining floating member 88 in a predominantly vertical disposition. Floating member 88 has a width constituting the distance between its side surfaces 89,90. Recess 85 has a width constituting the distance between its sidewalls 86,87. The width of recess 85 is greater than the width of floating member 88, to provide a clearance between a respective side surface 89,90 of floating member 88 and a respective sidewall 86,87 of recess 85. Slide bar lower portion 76 is cut away at 83 to receive lever 59 and to accommodate pivotal movement thereof. Rotation of lever 59 about pivot axis 60a, in a clockwise sense as viewed in FIG. 9, elevates lever end 58 which engages the lower end of floating member 88, the upper end of which engages a block 84 attached at the top of recess 85. This, in turn, elevates slide member 50 in turn urging lower jaw 55, carried by slide member 50, upwardly toward upper jaw 53 of the corresponding clamping assembly. Lever 59 is pivoted in a clockwise sense, as viewed in FIG. 9, by actuating a conventional hydraulic mechanism (not shown) associated with cylinder 70 to urge piston rod 69 downwardly.

Slide member 50 is lowered, to increase the vertical distance between upper and lower jaws 53,55, by pivoting lever 59 in a counterclockwise sense as viewed in FIG. 9. Pivotal movement in a counterclockwise sense is initiated by raising piston rod 69, employing the hydraulic mechanism associated with cylinder 70. When lever 59 is lowered it rests on a rest element 99 mounted on a ledge 100 at the bottom of recess 85 and constituting a projection from lower slide bar portion 76. Lever 59 supports its associated slide member 50 or 51 at all positions of the slide member.

Each slide member 50,51 is vertically movable independently of the other slide member. This is because each slide member is raised and lowered by its own lever 59, separate and distinct from the lever which raises and lowers the other slide member, and because each of the two levers 59 is actuated by a piston and cylinder separate and discrete from the piston and cylinder which actuates the other lever.

Referring to FIG. 9, upper jaw 53 has a lower engaging surface 98 which extends between the first or front end 96 of the upper jaw and a second or rear end 97 of the upper jaw. The upward force exerted by lower jaw 55 against upper jaw 53, carried at the bottom of cantilevered horn member 41, tends to deflect upwardly the free, unsupported end 47 of horn member 41 relative to the horn member's fixed end at 45. This results in an unequal distribution of pressure from the front end 96 of upper jaw 53 to its rear end 97, and that produces an unequal distribution of welding current, which is undesirable.

A linkage including floating member 88, recess 85 and associated structural elements comprises structure for equalizing the upwardly directed pressure exerted against the engaging surface 98 of upper jaw 53 between its front and rear jaw ends 96,97. This structure will now be described in greater detail, with reference to FIGS. 5, 7 and 9.

Block 84 at the top of recess 85 has a convex surface 91 which functions as a convex upper surface for recess 85. Floating member 88 has a concave upper surface 93, for engaging convex upper surface 91 of recess 85. Floating member 88 also has a concave lower surface 94, and lever end 58 has a convex upper surface 95 for engaging concave lower surface 94 of floating member 88. Each of the concave surfaces described in the preceding part of this paragraph has a larger radius of curvature than the convex surface engaged by that concave surface.

As noted above, there is a clearance between the sidewalls 86,87 of recess 85 and the side surfaces 89,90 of floating member 88. This clearance, and the concave and convex surfaces described in the preceding paragraph, comprise structure cooperating to permit floating member 88 to rock in recess 85 so as to equalize the upwardly directed pressure exerted through slide member 50 and lower jaw 55 against the engaging surface 98 of upper jaw 53.

As vertically disposed slide members 50,51 slide up and down relative to side frame member 30 and platen 34, respectively, the slide members are guided by structure now to be described. The following description will be in the context of guide structure associated with side frame 30, but essentially identical structure is also associated with platen 34. Referring to FIGS. 5-7 and 10, the slide bar's upper portion 76 has a pair of guide recesses 104,105, each located on a respective opposite end of slide bar upper portion 77. Received in each guide recess 104,105 is a slide gib 106 attached to a gib bar 107 attached to side frame member 30.

As shown in FIG. 10, attached to slide gib 106 is a first slide liner 108 for engaging a surface of guide recess 104. Attached to gib bar 107 is a second slide liner 109 for engaging a surface of slide bar upper portion 77 adjacent guide recess 104. Attached to the outer surface of the slide member's outer plate 78 is a slide plate 110 which engages a slide liner 111 attached to side frame member 30.

Figure 1:
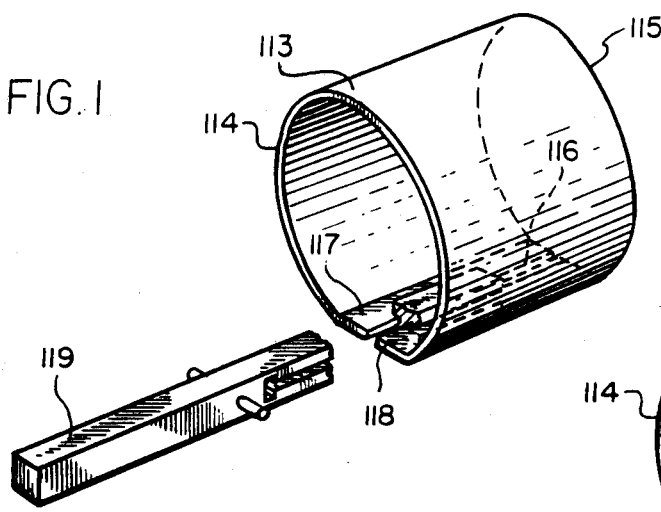
FIG. 1 is a perspective of a rim blank held in a loading tool, prior to a welding operation by a machine constructed in accordance with the present invention.
Figure 2:
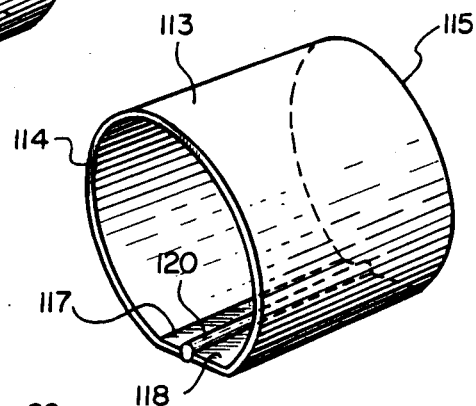
FIG. 2 is a perspective of the rim blank after the welding operation.

Referring now to FIGS. 1-2 and 19, there is shown a cylindrical rim blank 113 having respective front and rear ends 114,115 between which extends a longitudinal seam 116 defined by a pair of horizontally spaced apart, longitudinal edge portions 117,118 which are flattened, before welding, so that the edge portions are coplaner. Cylindrical blank 113 is mounted around cantilevered horn members 41,42 (FIG. 19) employing a loading tool 119 (FIG. 1) the details and function of which are described more fully in the aforementioned Tan, et al. '326 patent.

With rim blank 113 held by tool 119 in the manner illustrated in FIG. 1, the rim blank is fitted around horn members 41,42 with the holding tool 119 located between the two pairs of clamping assemblies, one of which is defined by upper and lower jaws 54,56 and the other of which is defined by upper and lower jaws 53,55 (FIG. 19). The two clamping assemblies are maintained laterally spaced apart, employing structure to be described below, a distance sufficient to permit the ready insertion of holding tool 119 therebetween. Then the two slide members 50,51 are elevated to clamp, between the upper and lower jaws of each clamping assembly, a respective longitudinal edge portion 117,118 of the cylindrical rim blank. The two clamping assemblies are then moved laterally further apart to facilitate the removal of loading tool 119, following which the two clamping assemblies are moved laterally toward each other, to press the two longitudinal edge portions 117,118 together. Welding current is then applied across the seam defined by the two longitudinal edge portions 117,118.

The application of lateral pressure to urge the longitudinal edge portions 117,118 together is continued during application of the welding current. The combined heat and pressure softens and upsets the metal at longitudinal seam 116 to form a butt weld 120 at the location of the longitudinal seam (FIGS. 2 and 19). Slide members 50,51 are then lowered to unclamp the jaws, and the welded rim blank 113 is removed from the cantilevered horn members 41,42. Thereafter, on other machines, the surplus welding bead is removed, and flattened portions 117,118 are rounded to provide rim blank 113 with a full circular cross-section.

Current for the welding operation is supplied with conducting elements illustrated in FIGS. 4-6 and 9. A source of welding current, preferably pulsating DC current, is located behind the welding machine's rear plate 33. Connected to the current source is a pair of bus bars 121,122, separated by an insulator strip 123. The bus bars extend from the rear to the front of the machine, below slide members 50,51.

Each slide member 50,51 is composed of an electrical conducting material such as copper. More particularly, the lower and upper ends of each slide member, defined in part by lower and upper plates 75,81 respectively, as well as all the other components of each slide member, are composed of electrical conducting material. The upper end of each electrically conductive slide member is connected to a corresponding lower jaw 55,56, carried by that slide member, by electrode retainer 82, also composed of a conducting material such as copper, and each of the upper and lower clamping jaws in each clamping assembly is composed of conducting material.

The lower end 75 of each electrically conductive slide member is electrically connected to a respective bus bar 121,122 by a flexible connector member 124. Each flexible connector member 124 is C-shaped and is composed of a highly conductive metal such as silver-plated copper. The C-shaped, flexible connector member 124 has an upper end portion 125 connected to lower plate 75 on a slide member 50,51 and a lower end portion 126 connected to a respective bus bar 121,122. Upper and lower end portions 125,126 of flexible connector member 124 are joined together by a bight 127.

Figure 6:
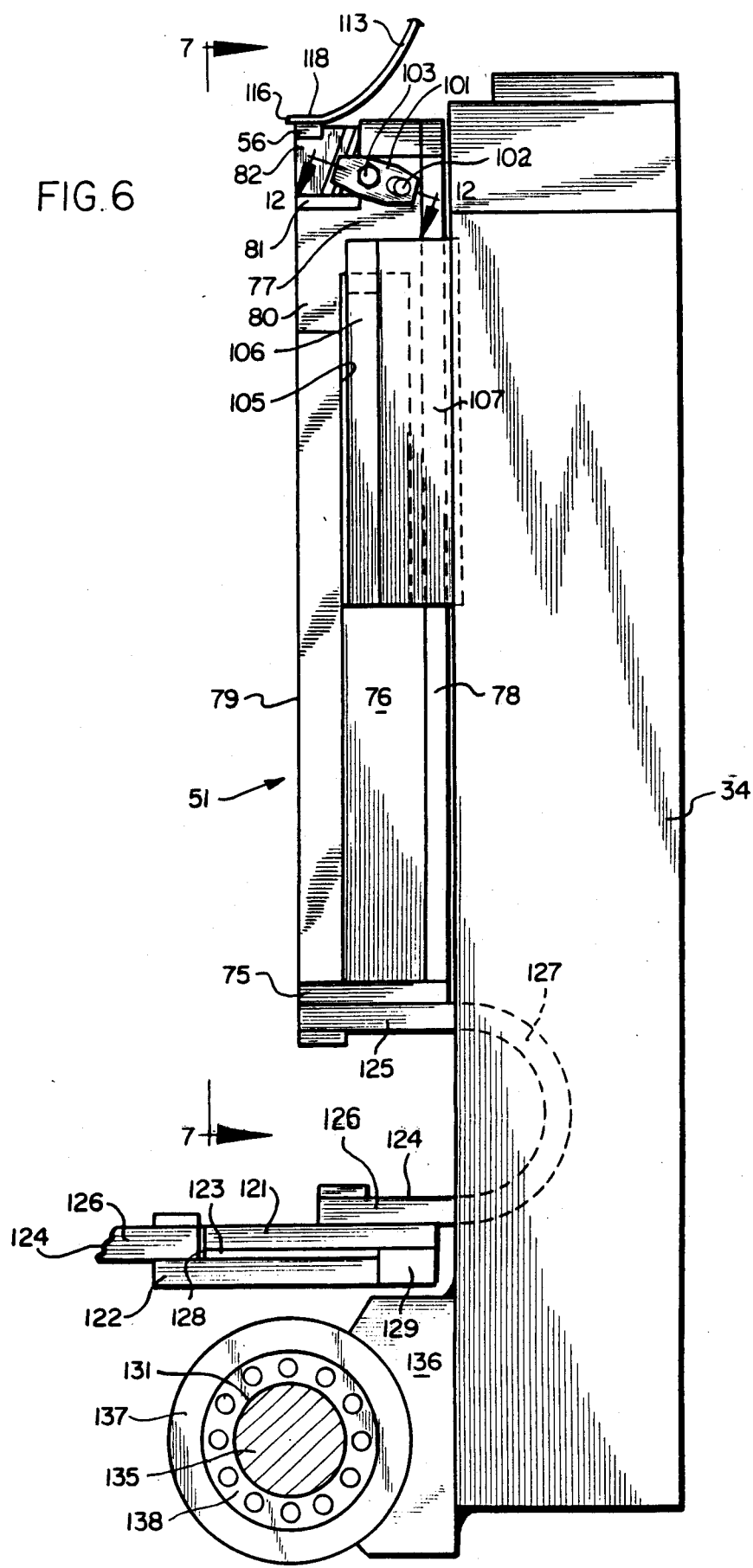
FIG. 6 is an enlarged sectional view taken along line 6—6 in FIG. 3.

As shown in FIG. 6, an insulator strip 128 separates bus bar 121 from the lower end portion 126 of the flexible connector member associated with slide member 50. Also shown in FIG. 6 is an elongated insulator strip 129 which helps to electrically insulate the two bus bars 121,122 from each other.

Each flexible connector member 124 comprises structure for accommodating movement of the slide member 50,51 to which the connector member is electrically connected while maintaining the electrical connection between the slide member and its associated bus bar 121 or 122.

During a welding operation, current moves through one of the bus bars, e.g., 121, through its associated flexible connector member 124, then up through the associated electrically conductive slide member, e.g., 51, and lower jaw 56 carried thereby, through rim blank 113, across seam 116, through the other lower jaw 55, then down through the other slide member 50, and its associated flexible connector 124, and then through bus bar 122. Current flows in opposite directions through slide members 50 and 51 creating mutually repulsive magnetic fields which tend to urge the slide members laterally away from each other, as viewed in FIG. 4.

The current flow described in the preceding paragraph is more tolerable than if the current flowed through the two cantilevered horn members 41,42 and their associated mounting members 39,40. That would produce mutually repelling magnetic fields around each of the two horn members and their associated mounting members, and the two cantilevered horn members and their associated mounting members would tend to repel each other laterally, as viewed in FIG. 3. That would be undesirable because, during a butt welding operation, cantilevered horn member 42 and its associated mounting member 40 are urged in a lateral direction toward horn member 41 and its mounting member 39 by a lateral force exerted primarily at the front end of the welding machine, adjacent front plate 32. The end result would be that, during a butt welding operation, horn member 42 and its mounting member 40 would be subjected to a horizontal bending force, and this would be undesirable because the bending force would be exerted at least in part along the length of upper jaw 54, from the front end to the rear end of the jaw.

In contrast, in the arrangement employed in accordance with the present invention, there are no opposing magnetic fields associated with each of the cantilevered horn members and their respective mounting members, and no cantilevered horn member is subjected to a horizontal bending force. Accordingly, there are no bending forces along the length of any jaw, between its front and rear ends. To the extent that opposing magnetic fields create a mutual repulsion, in a lateral direction, that occurs along the vertical dimension of movable slide members 50,51 a location where it is more tolerable.

Referring to FIGS. 3 and 12, electrode retainer 82 is secured to the slide bar's upper portion 77 by a pair of clamping elements 101,101 each located at a respective one of the front and rear ends of retainer 82. Each clamping element 101 is removably mounted on the slide bar's upper portion 77 by a pin 102 and is secured in place by a bolt 103. Each clamping element 103 has an inwardly directed end portion 112 received within a groove 120 in retainer 82, to effect the securement.

Referring now to FIGS. 3-4, 6 and 8-9, there is illustrated structure for moving one of the clamping assemblies comprising upper and lower jaws 54,56 toward and away from the other clamping assembly. As noted above, platen 34 carries horn member 42 and its associated mounting member 40. Also mounted on platen 34 is slide member 51 and its associated elevating and lowering structure including pivotal lever 59 and hydraulic cylinder 70.

Platen 34 is mounted for pivotal movement about the axis of a pivot shaft 131. As shown in FIG. 4, the axis of pivot shaft 131 is located directly below the center of the space between the two clamping assemblies composed of jaws 54,56 and 53,55 respectively.

Referring to FIGS. 4, 6 and 8-9, pivot shaft 131 extends between the lower ends of front and rear frame plates 32,33. Located at the lower end of each frame plate 32,33 is a bearing 132,133, preferably a tapered roller bearing. Each bearing 132,133 receives a respective end portion 134,135 of pivot shaft 131, to mount shaft 131 for rotational movement relative to end plates 32,33. Fixed to the lower end of platen 34, at each of the front end and rear end thereof, is a bracket 136 which carries a collar 137 fixedly mounted on pivot shaft 131 preferably employing a wedge type arrangement illustrated schematically at 138 in FIGS. 8 and 9. Pivotal movement of platen 34 about the axis of shaft 131 is effected by structure illustrated in FIGS. 3 and 4.

More particularly, attached to the top of platen 34, near the front end thereof, is a clevis 140 connected by a pivot pin 141 to a rod eye 142 extending from a retainer 143 connected to an adjustment tube 144 threadedly mounted on a threaded portion 145 of a piston rod extending through a spring box 146 and connected to a piston 151 located within a hydraulic cylinder 147 from which extends a clevis 148 connected by a pivot pin 149 to a knuckle 150 attached to side frame member 31. Spring box 146 has a pair of legs 152 each terminating at an anti-rotation block 153 mounted on a cross member 49 extending between front and rear frame plates 32,33 (FIG. 3).

Piston 151 can be actuated within hydraulic cylinder 147 to urge the piston rod either to the left or to the right as viewed in FIG. 3. Movement of the piston rod to the left, as viewed in FIG. 3, urges platen 34 to pivot about the axis of pivot shaft 131 in a counterclockwise sense as viewed in FIGS. 4 and 6. Conversely, movement of the piston rod to the right, as viewed in FIG. 3, causes platen 34 to pivot about the axis of shaft 131 in a clockwise sense as viewed in FIGS. 4 and 6.

Pivotal movement of platen 34 in a counterclockwise sense, as viewed in FIGS. 4 and 6, urges the clamping assembly composed of upper and lower jaws 54,56 to move laterally towards the clamping assembly composed of jaws 53,55. Conversely, pivotal movement of platen 34 in a clockwise sense, as viewed in FIGS. 4 and 6, causes the clamping assembly composed of jaws 54,56 to move laterally away from the clamping assembly composed of jaws 53,55.

As shown in FIG. 6, bight 127 of C-shaped flexible connector member 124 is spaced away from the lower and upper end portions 124,125 of the flexible connector member in a direction transverse to the horizontal pivotal axis for platen 34.

As noted above in connection with FIG. 1, rim blank 113 is mounted on the cantilevered horn members using a loading tool 119 which is inserted into the seam 116 between the two longitudinal edge portions of the rim blank. To facilitate the employment of the loading tool, and to align each clamping assembly with a respective longitudinal edge portion at the spacing defined by the loading tool, it is desirable that the jaws 54,56 in the clamping assembly carried by platen 34 be spaced apart laterally from the jaws 53,55 in the other clamping assembly by a predetermined, fixed distance. Then, after both longitudinal edge portions of rim blank 113 have been clampingly engaged by the upper and lower jaws in the two clamping assemblies, it is desirable that the two clamping assemblies be spaced apart laterally, a greater, predetermined, fixed distance, to facilitate the removal of loading tool 119. The linkage between platen 34 and cylinder 147 includes structure for performing these functions, and this structure will now be described with reference to FIGS. 16 and 17.

Spring box 146 comprises a housing 154 through which piston rod 145 extends. Housing 154 has a first end portion 155 facing platen 34. The housing's first end portion 155 threadedly engages threaded piston rod portion 145 to fix the housing on the piston rod. Housing 154 also has a second end portion 156 secured to housing 154 with fasteners (not shown). The housing's second end portion 156 faces cylinder 147. Located partially within spring box 146 is an enlarged, unthreaded piston rod portion 155. A washer 158 is sandwiched between housing first end portion 155 and piston rod enlarged portion 157.

Figure 16:
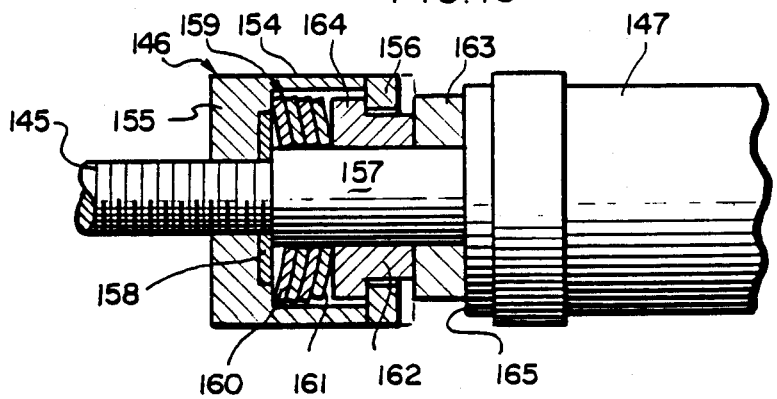
FIG. 16 is a fragmentary, sectional view illustrating stop structure employed in the machine.

Slidably mounted around the piston rod's enlarged portion 157 is yieldable spring means indicated generally at 159 and, in the illustrated embodiment, comprising a plurality of disk springs the internal resiliency of which gives them the bowed configuration illustrated in FIG. 16. Spring means 159 has a first end portion 160 facing first end portion 155 of housing 154 and a second end portion 161 facing the housing's second end portion 156. Spring means 159 is resiliently compressible in the axial direction of the piston rod (to the right as viewed in FIGS. 16 and 17), between a normally expanded condition shown in FIG. 16 and a contracted condition shown in FIG. 17.

Also slidably mounted on the piston rod's enlarged portion 157 is a tubular stop element comprising a first end portion 163 located outside of housing 154 between the housing's second end portion 156 and cylinder 147. The stop element also includes a second end portion 164 located within housing 154. The two end portions of the stop element are connected by an intermediate portion 162. In the illustrated embodiment, intermediate portion 162 is integral with second end portion 164, and first end portion 163 is attached to intermediate portion 162 with fasteners (not shown).

The housing's first end portion 155 comprises structure for engaging first end portion 160 of the spring means, and the spring means' second end portion 161 comprises structure for engaging the stop element's second end portion 164. The stop element's second end portion 164 comprises structure for engaging the housing's second end portion 156 when (a) the housing's first end portion 155 engages first end portion 160 of the spring means and (b) the second end portion 161 of the spring means engages the stop element's second end portion 164.

Figure 17:
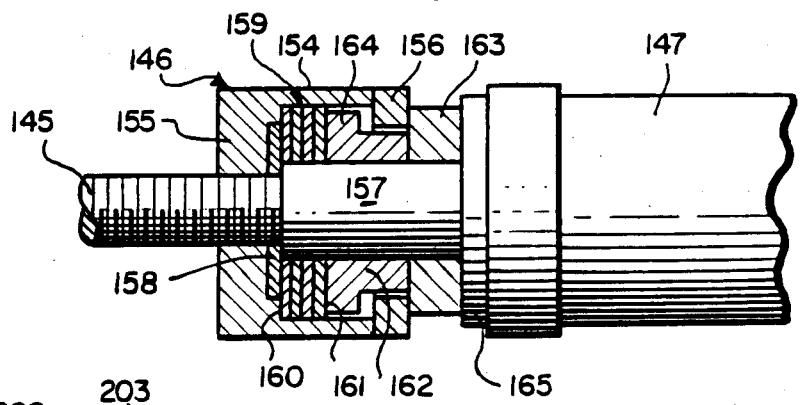
FIG. 17 is a sectional view similar to FIG. 16 illustrating the stop structure in another position.

The stop element's first end portion 163 comprises structure for engaging cylinder 147 at its end 165 when either of the stop element's two end portions 164 or 163 is in engagement with the housing's second end portion 156. The housing's second end portion 156 comprises structure for engaging the stop element's first end portion 163 when (a) both end portions 160,161 of spring means 159 are engaged and (b) the spring means is in its contracted position (FIG. 17).

Spring means 159 normally maintains the housing's second end portion 156 spaced away from the stop element's first end portion 163, when the spring means is in its expanded condition. The action of spring means 159 which maintains housing second end portion 156 spaced away from the stop element's first end portion 163, can be overcome by actuating piston 151, as will be described subsequently below.

As noted above, movement of piston 151 to the right as viewed in FIG. 3, increases the spacing between the two clamping assemblies. The structure illustrated in FIGS. 16 and 17 halts the movement of piston 151 when the two clamping assemblies are laterally spaced apart the aforementioned first predetermined distance and also halts the movement of the piston, in the direction described above, when the two clamping assemblies are spaced apart the aforementioned second predetermined distance, which is greater than the first predetermined distance.

More particularly, when piston 151 is urged to the right as viewed in FIG. 3, spring box 146, fixedly mounted on piston rod portion 145, is also urged to the right. Initially, as piston rod portion 145 moves to the right, as viewed in FIG. 16, with spring means 159 in a relaxed condition, the housing's first end portion 155 engages first end portion 160 of the spring means. This causes spring means 159 to slide along piston rod enlarged portion 157, and the engagement of second end portion 161 of the spring means with second end portion 164 of the tubular stop element causes the stop element to slide along the piston rod's enlarged portion 157 until the stop element's first end portion 163 engages cylinder end 165. This stops further movement of the stop element which acts through spring means 159 to stop further movement of housing 154 which in turn stops further movement of piston rod portion 145 and piston 151 until the fluid-actuated piston is subjected to sufficient fluid pressure to overcome the stop effect described above. The fluid pressure initially exerted against piston 151 is adjusted, in a preliminary operation employing conventional means not shown, so that it is insufficient to compress spring means 159. Once this fluid pressure is determined, it is noted, and a setting is employed so that the same fluid pressure may be obtained on demand.

When the above-described first stop act occurs, the housing's second end portion 156 is spaced away from the stop element's first end portion 163 (FIG. 16). In addition, spring means 159 is in the uncompressed, bowed condition shown in FIG. 16. When the stop element's first end portion 163 engages cylinder end 165, and spring means 159 is uncompressed, as shown in FIG. 16 (i.e., the first stop), the lateral spacing between the two clamping assemblies is a predetermined distance which facilitates the insertion of loading tool 119 between the two clamping assemblies and aligns each clamping assembly with a respective longitudinal edge portion of the rim blank, at the spacing defined by the loading tool.

The stop action effected by spring means 159 can be overcome by increasing the fluid pressure exerted against piston 151 until it is large enough to compress yieldable spring means 159. The increased fluid pressure on piston 151 causes it to move to the right, as viewed in FIG. 3, causing piston rod portion 145 to move to the right as viewed in FIGS. 16 and 17. This in turn causes housing 154 to move to the right, and spring means 159 is compressed between the housing's first end portion 155 and the stop element's second end portion 164. Housing 154 continues to move to the right until the housing's second end portion 156 engages the stop element's first end portion 163 (FIG. 17). This acts as a second stop and prevents further movement to the right of piston rod portion 145 and of piston 151. When the second stop has been effected, the two clamping assemblies are spaced apart a second predetermined distance sufficient to enable the ready removal of the loading tool from between the clamping assemblies. The second stop action is initiated after the lower jaws in each of the two clamping assemblies have been moved upwardly to effect the clamping action.

The structure for effecting the first stop includes the stop element's first end portion 163 when it engages cylinder end 165. The structure for effecting the second stop includes the housing's second end portion 156 when it engages the stop element's first end portion 163 after the latter has engaged cylinder end 165.

The two clamping assemblies are urged laterally together by subjecting piston 151 to a fluid pressure which urges it to move to the left as viewed in FIG. 3, in turn causing piston rod portion 145 to move to the left as viewed in FIGS. 16 and 17. This in turn moves housing 154 to the left, causing the housing's second end portion 156 to move from (a) a position engaging the stop element's first end portion 163 and spaced from the stop element's second end portion 164 to (b) a position spaced from the stop element's first end portion 163 and engaging the stop element's second end portion 164. As housing 154 continues to move toward the clamping assemblies, with its second end portion 156 engaging the stop element's second end portion 164, the stop element's first end portion 163 is withdrawn from engagement with cylinder end 165, creating a space between the stop element's first end portion 163 and cylinder end 165. Movement of housing 154 to the left also causes spring means 159 to return from the compressed condition illustrated in FIG. 17 to the relaxed condition illustrated in FIG. 16.

When stop structure 154-164 is in either of the two stop positions illustrated in FIGS. 16 and 17 respectively, or when the stop structure is in a fully relaxed condition, the spacing between the two clamping assemblies may be finely adjusted employing structure now to be described, with reference to FIG. 4. As noted above, part of the linkage which connects platen 34 to cylinder 147 comprises a retainer 143 and an adjustment tube 144. Adjustment tube 144 has an internally threaded portion 168 which receives threaded piston rod portion 145. Extending toward platen 34 from adjustment tube 144 is a necked-down portion 169 integral with a flange 170 received within a recess 171 in retainer 143. Flange 170 is held within recess 171 by a split ring 172 surrounding necked-down portion 169. Split ring 172 is attached to retainer 143 with fasteners (not shown).

Because of the threaded engagement between adjustment tube 144 and piston rod portion 145, adjustment tube 144 can be rotated to move axially in relation to piston rod portion 145. Flange 170 rotates within recess 171 as adjustment tube 144 is rotated in relation to piston rod portion 145. Axial movement of adjustment tube 144, to the right as viewed in FIG. 4, increases the spacing between the two clamping assemblies. Conversely, axial movement of adjustment tube 144 to the left, as viewed in FIG. 4, decreases the spacing between the two clamping assemblies.

Figure 14:
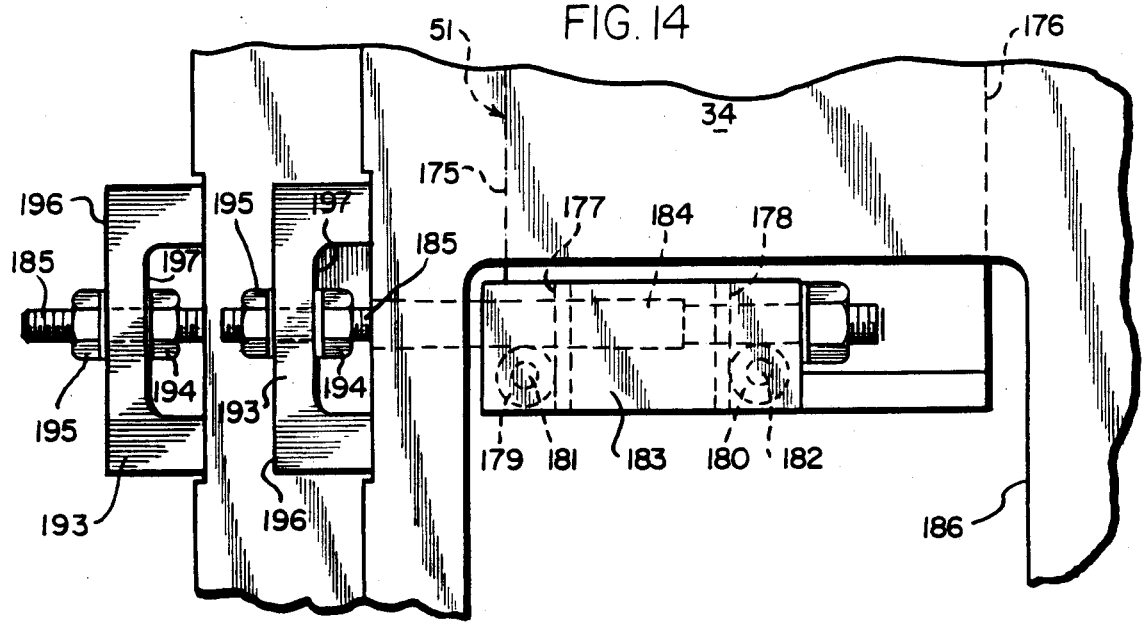
FIG. 14 is a fragmentary, side elevational view illustrating the adjusting mechanism of FIG. 13.
Figure 15:
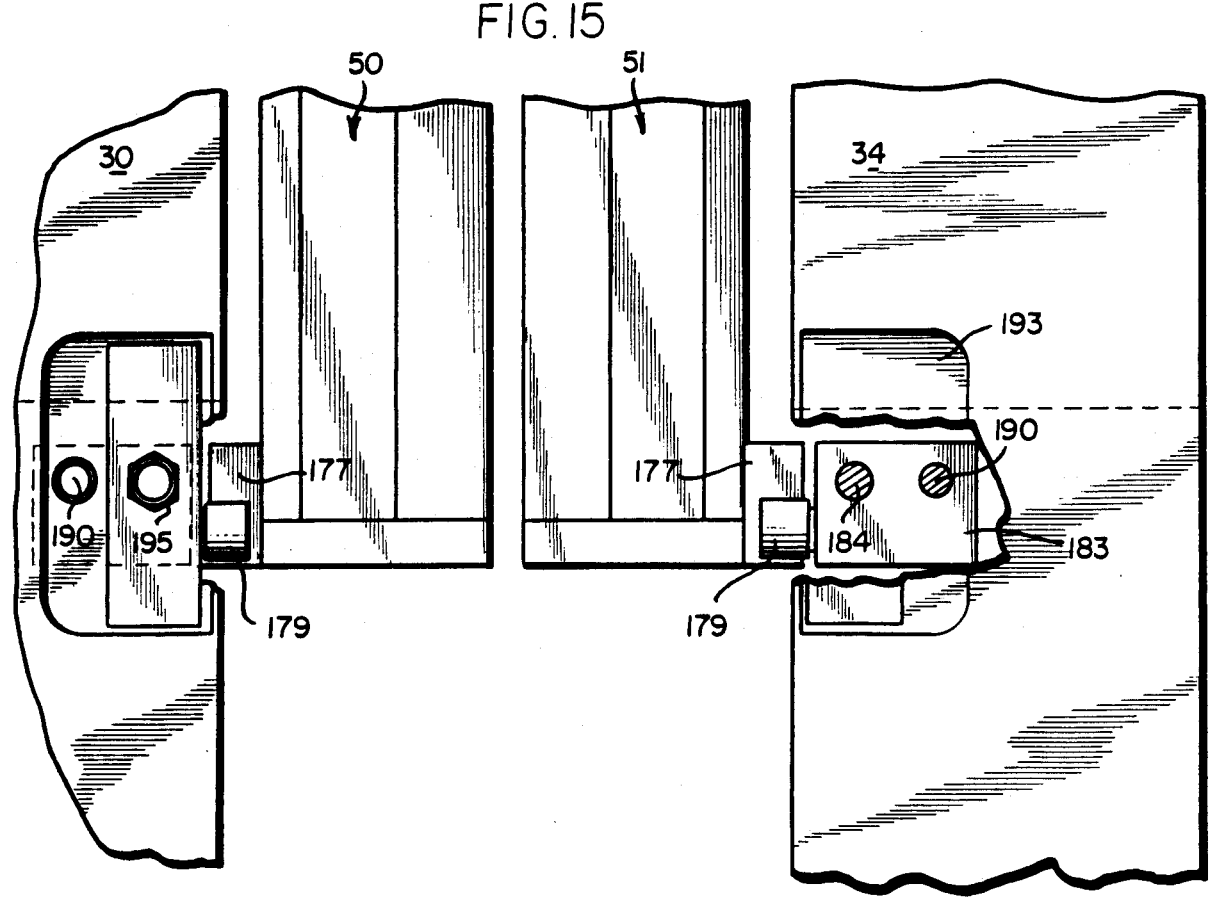
FIG. 15 is a fragmentary, front view, partially in section and partially cut away, illustrating the adjusting mechanism of FIGS. 13-14.

Referring again to FIGS. 1 and 2, there may be times when it is desirable to exert a non-uniform clamping pressure along longitudinal edge portion 117 or 118 of rim blank 113, from the front end to the rear end of the longitudinal edge portion. This would occur when there are surface irregularities along the longitudinal edge portion. The effect of a surface irregularity can be offset by applying a non-uniform clamping pressure along the length of the longitudinal edge portion. A non-uniform clamping pressure can be obtained by introducing a bias in the force exerted through a lower jaw 55 or 56, along the dimension thereof between its front end 173 and its rear end 174 (FIG. 5). Structure for enabling the introduction of such a bias into a lower jaw is illustrated in FIGS. 13-15.

Each slide member 50,51 has a front end 175 and a rear end 176 corresponding to the front and rear ends 173,174 respectively of the lower jaw carried by that slide member (FIG. 5). Fixed to the outer plate 78 of each slide member is a pair of vertically disposed pads 177,178, spaced apart in a direction from front to rear of the slide member. Each pad 177,178 has a front side and a rear side. Engaging the front side of pad 177 is a first cam follower 179 having an axle 181 attached to a carrier element 183 located alongside the slide member's outer plate 78, near the bottom thereof. Engaging the rear side of pad 178 is a second cam follower 180 having an axle 182 attached to carrier element 183.

Carrier element 183 is located within a recess 186 near the bottom of platen 34. There is a similar recess near the bottom of side frame member 30 to accommodate the carrier element associated therewith. Carrier element 183 is mounted on a horizontally disposed adjustment member 184 extending in a direction from front to rear of the adjacent slide member, e.g., 51. Axles 181 and 182 mount their respective cam followers 179 and 180 for rotation about a horizontal axis extending transversely to adjustment member 184.

Each adjustment member 184 extends in a frontward direction through an opening 187 or 188 in the front of platen 34 and side frame member 30 respectively. Adjustment member 184 terminates at a threaded rod portion 185. Extending in a frontward direction from carrier element 183 is a slide pin 189 having a rear portion thereof fixed to carrier element 183. Slide pin 189 is received within a bushing 190 located within an opening 191 or 192 in the front of platen 34 and side frame member 30 respectively.

Because carrier element 183 and adjustment member 184 are mounted on platen 34 or side frame member 30, and because platen 34 and side frame member 30 are fixed relative to vertical movement by slide members 50 and 51, carrier element 183 and adjustment member 184 are similarly fixed.

Mounted on the front of platen 34 and of side frame member 30 is a C-shaped bracket 193 comprising a vertically disposed part having front and rear surfaces 196,197 respectively. The threaded rod portion 185 of adjustment member 184 extends through the vertically disposed part of bracket 193. A first nut 194 is mounted on threaded rod portion 185, between platen 34 (or side frame member 30) and bracket 193. A second nut 195 is mounted on threaded rod portion 185 on the outside of bracket 193. Adjustment member 184 can be moved horizontally, with its corresponding carrier element 183, in frontward and rearward directions, by turning one of the two nuts 194,195.

When nut 195 is rotated on threaded rod portion 185, to engage front surface 196 of the vertically disposed part of bracket 193, continued rotation of nut 195 urges adjustment member 184 and its associated carrier element 183 in a frontward direction (to the left as viewed in FIG. 14). When nut 194 is rotated on threaded rod portion 185, to engage rear surface 197 of the vertically disposed part of bracket 193, continued rotation of nut 194 urges adjustment member 184 and carrier element 183 in a rearward direction (to the right as viewed in FIG. 14). As carrier element 183 is urged in frontward or rearward directions, slide pin 189 moves frontwardly or rearwardly within bushing 190.

When carrier element 183 is urged in a frontward direction, second cam follower 180 pushes against the rear surface of pad 178, thereby exerting a horizontal force in a frontward direction against the rear side of pad 178. Conversely, when carrier element 183 is urged in a rearward direction, first cam follower 179 exerts a horizontal force in a rearward direction against the front side of front pad 177. Because pads 177,178 are attached to the bottom of a vertically disposed slide member, e.g., 51, any frontward or rearward force exerted against these pads is transferred to the slide member and causes the slide member to cock or tilt slightly from true vertical, relative to its mounting member, e.g., platen 34, as will be explained more fully below.

With reference to FIGS. 3 and 10, each vertically disposed slide member 50,51 is mounted for vertical movement relative to side frame member 30 or platen 34 by mounting members in the form of gibs 106 and gib bars 107, the details of which have been described above. There is a mounting member 106,107 at the front end of each slide member and at the rear end of each slide member. As best shown in FIG. 10a, there is a clearance between the innermost surface 199 of gib 106 and the adjacent surface 198 of recess 104 within which gib 106 is received. FIG. 10a illustrates the clearance at the front end of slide member 50. There is a similar clearance between the recess and the gib at the rear end of the slide member. These clearances enable the slide member to be tilted off a true vertical disposition, in a frontward or rearward direction, in response to the operation of the adjusting structure illustrated in FIGS. 13-15.

Figure 7:
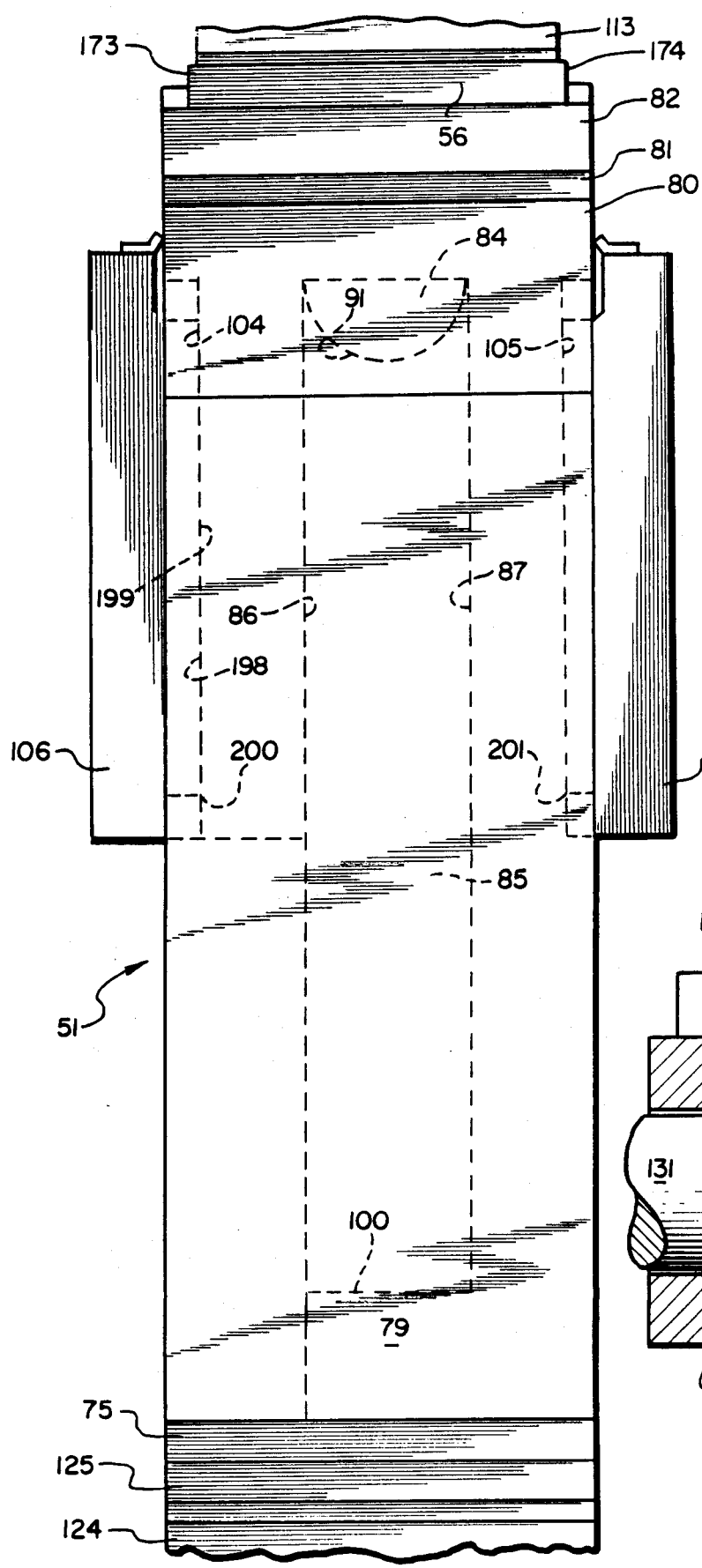
FIG. 7 is a fragmentary, sectional view taken along line 7—7 in FIG. 6.
Figure 8:
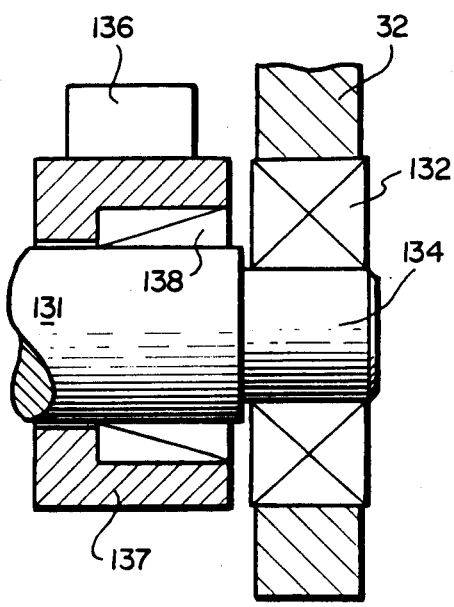
FIG. 8 is an enlarged, fragmentary, sectional view taken along line 8—8 in FIG. 4.

More particularly, referring to FIG. 7, when the slide member 51 is urged in a frontward direction (to the left as viewed in FIG. 7), inside surface 198 of recess 104 in the slide member is urged toward adjacent surface 199 of gib 106 until the lower edge 200 of gib surface 199 is engaged by recess surface 198, at which time there is a pivoting movement of slide member 51 in a clockwise sense about edge 200, as viewed in FIG. 7, causing the upper part of the slide member to pivot to the right as viewed in FIG. 7, the pivotal movement being accommodated by the clearance between gib 106 and recess 105 on the rear end of the slide member. Conversely, when the bottom of slide member 51 is urged in a rearward direction (to the right as viewed in FIG. 7), there is a pivotal movement about lower edge 201 of gib 106 at the rear end of slide member 51, and the upper part of the slide member is cocked or tilted to the left as viewed in FIG. 7.

The clearances are located closer to the top of the slide member than to the bottom thereof, and the structure for effecting the horizontal adjustment at the bottom of the slide member is located closer to the bottom than to the top thereof. The pivotal tilt axis 200 or 201 extends in a direction transverse to the frontward and rearward directions in which the horizontal adjustment is effected, and the pivotal axis is located adjacent a gib 106.

When slide member 50 or 51 is cocked or tilted in the manner described above, a bias is introduced into the force exerted through the lower jaw carried by that slide member, along the dimension of the lower jaw between its front and rear ends (e.g., between ends 173 and 174 of lower jaw 56 (FIG. 7)).

Referring to FIG. 5, the linkage between a slide member and its elevating lever 59, namely, the linkage comprising floating member 88, recess 85, and the convex and concave surfaces 91,93 and 94,95, associated with floating member 88, constitutes structure for transmitting an upwardly directed force to the slide member while accommodating the tilt of the slide member off a true vertical disposition.

Figure 18:
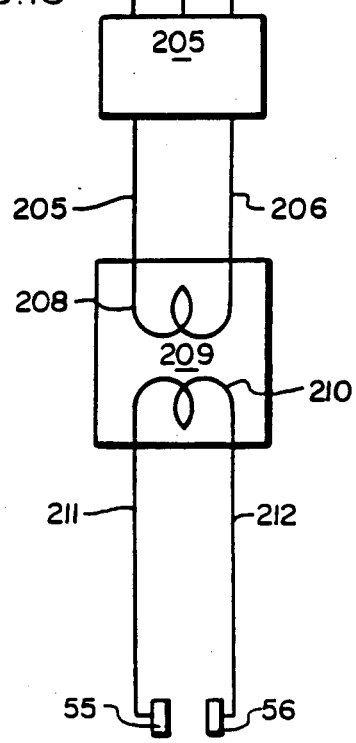
FIG. 18 is a schematic diagram of an electrical circuit used to produce a pulsating DC current in the welding machine.

Referring to FIG. 18, a pulsating DC current is supplied to lower jaws (electrodes) 55,56 using the circuit illustrated schematically in FIG. 18. More particularly, alternating, three-phase current is supplied from an outside source with lines 202,203,204. The AC current is fed into a rectifier 205 where it is converted to reversing, pulsating DC primary current. Typically, the AC current fed into rectifier 205 has a frequency of 60 Hertz and a voltage of, e.g., 480 volts. The reversing, pulsating DC primary current has a similar voltage.

Rectifier 205 is connected by lines 205,206 to the primary coil 208 of a transformer 209 having a secondary coil 210 connected by circuits 211,212 to electrodes 55,56 respectively. Transformer 209 converts the primary voltage of 480 volts to a secondary, reversing, pulsating DC voltage of, e.g., 10 volts.

Circuit 211, connecting transformer 209 to electrode 55, comprises bus bar 122, flexible connector 124 and the conductive elements of slide member 50 located between connector 124 and electrode 55 (e.g., elements 75-82). Circuit 212, connecting transformer 209 to electrode 56, comprises bus bar 121, its associated flexible connector 124 and the conductive elements of slide member 51 located between flexible connector 124 and electrode 56 (e.g., elements 75-82).

The welding machine of the present invention performs an upset butt welding operation employing pulsating DC current. This is more desirable than using non-pulsating DC current because that type of current required the use of a secondary rectifier which resulted in large voltage losses and was thus relatively inefficient. The use of a pulsating DC current, as in the present invention, eliminates the secondary rectifier entirely, resulting in a more efficient use of electric current.

Circuits 211,212 are electrically isolated from the rest of the machine with insulating members at appropriate places. For example, referring to FIGS. 3 and 4, there is an insulator 214 between platen 34 and clevis 140, and an insulator 215 between side frame 31 and knuckle 150 located to the right of hydraulic cylinder 147, as viewed in FIG. 4. Referring to FIG. 9, there is an insulator 216 between the bottom of each horn member's mounting member (e.g., 39) and upper knuckle 73, located above hydraulic cylinder 70. In addition, there is an insulator 217 between each lever end 61 and lower knuckle 66, located below hydraulic cylinder 70. As shown in FIG. 10, there is an insulator 220 between side frame member 30 and the frame's front plate 32. Similarly, there is an insulator 221 between side frame member 30 and the frame's rear plate 33. As shown in FIG. 9, there is an insulator 222 between lower bus bar 122 and the frame's rear plate 33, where the bus bars extend through that plate.

The various parts of the machine are connected together in a conventional manner, typically by fasteners such as bolts, most of which have not been shown to avoid cluttering the drawings.

The foregoing detailed description has been given for clearness of understanding only, and no unnecessary limitations should be understood therefrom, as modifications will be obvious to those skilled in the art.

We claim:

1. In a machine for butt welding together a pair of horizontally spaced apart, parallel, longitudinal edge portions, said machine including (a) a cantilevered horn member having an unsupported end, (b) a stationary upper jaw, located on the bottom of said cantilevered horn member, said upper jaw having an engaging surface for engaging the upper surface of one of said edge portions, said engaging surface extending in the same direction as said cantilevered horn member between first and second jaw ends, (c) a lower jaw for engaging the lower surface of said one edge portion, and (d) an assembly mounting said lower jaw for sliding, vertical movement toward and away from said upper jaw, said assembly (d) comprising:
   a vertically disposed slide member having an upper portion carrying said lower jaw;
   a mounting member comprising means mounting said slide member for vertical sliding movement;
   said slide member having a vertically disposed, elongated recess having spaced apart sidewalls;
   a vertically disposed, elongated floating member located in said recess and having spaced apart side surfaces;
   said recess comprising means for maintaining said floating member in a predominantly vertical disposition;
   said floating member having a first width constituting the distance between said side surfaces;
   said recess having a second width constituting the distance between said sidewalls, said second width being greater than said first width to provide a clearance between a respective side surface of the floating member and a respective sidewall of said recess;
   said recess having a convex upper surface;
   said floating member having a concave upper surface, for engaging said convex upper surface of said recess, and a concave lower surface;
   a movably mounted element comprising means for raising and lowering said slide member;
   said element having a convex surface thereon for engaging the concave lower surface of said floating member;
   each of said concave surfaces having a larger radius of curvature than the convex surface engaged by said concave surface;
   said clearance and said concave and convex surfaces comprising means cooperating to permit said floating member to rock in said recess, so as to equalize the upwardly directed pressure exerted through said slide member and said lower jaw against the engaging surface of said upper jaw between said first and second jaw ends.

2. In a machine for butt welding together a pair of horizontally spaced apart, parallel, longitudinal edge portions, said machine including (a) a cantilevered horn member having an unsupported end, (b) a stationary upper jaw, located on the bottom of said cantilevered horn member, said upper jaw having an engaging surface for engaging the upper surface of one of said edge portions, said engaging surface extending in the same direction as said cantilevered horn member between first and second jaw ends, (c) a lower jaw for engaging the lower surface of said one edge portion, and (d) an assembly mounting said lower jaw for sliding, vertical movement toward and away from said upper jaw, said assembly (d) comprising;
   a vertically disposed slide member having an upper portion carrying said lower jaw;
   a mounting member comprising means mounting said slide member for vertical sliding movement;
   a movably mounted element comprising means for raising and lowering said slide member;
   and a linkage between said element and said slide member;
   said linkage comprising means for urging the slide member and said lower jaw upwardly toward said upper jaw, in response to the movement of said element, and for equalizing the upwardly directed pressure exerted against the engaging surface of the upper jaw between said first and second jaw ends.

3. In a machine for butt welding together a pair of horizontally spaced apart, longitudinal edge portions, said machine including (a) a pair of spaced apart, lower jaws each for engaging one of said longitudinal edge portions, each of said lower jaws comprising a welding electrode, (b) a pair of vertically disposed, spaced apart slide members each having an upper portion carrying a respective one of said lower jaws, (c) means mounting each of said slide members for vertical movement independently of the other slide member, (d) means mounting one of said slide members for pivotal movement about a horizontal axis to urge one of said lower jaws toward the other lower jaw, and (e) a pair of horizontally disposed, cantilevered horn members each having an unsupported outer end located above a respective one of said jaws, the improvement wherein said machine further comprises:

a pair of bus bars each located below a respective slide member and each connectable to a source of welding current;

each slide member comprising vertically disposed conductor means, said conductor means having an upper end, connected to the jaw carried by said slide member, and a lower end;

and a pair of flexible connector members each electrically connecting the lower end of a respective conductor means to a respective bus bar;

each of said flexible connector members comprising means for accommodating the vertical movement of the conductor means to which the connector member is electrically connected while maintaining the electrical connection between the conductor means and its bus bar.

4. In a machine as recited in claim 3 wherein:

each of said flexible connector members is C-shaped and is composed of highly conductive metal;

said C-shaped member having an upper end portion connected to the lower end of said conductor means and a lower end portion connected to said bus bar;

the bight of said C-shaped being spaced away from said upper and lower end portions in a direction transverse to said horizontal pivotal axis.

5. In a machine for butt welding together a pair of horizontally spaced apart, longitudinal edge portions, said machine including (a) first and second pairs of upper and lower jaws, each of said pairs comprising means for engaging one of said longitudinal edge portions, (b) means mounting each of said lower jaws for vertical movement relative to the upper jaw in the same pair and independently of the other lower jaw, and (c) means for changing the horizontal spacing between said first and second pairs of jaws, said spacing-changing means including (d) means mounting said first pair of jaws for movement toward and away from the second pair of jaws, (e) a horizontally disposed, fluid-actuated piston, (f) a cylinder enclosing said piston, and (g) a linkage between said piston and said first pair of jaws, said linkage (g) comprising:

first stop means for halting the movement of said piston when the two pairs of jaws are horizontally spaced apart a first predetermined spacing;

and second stop means for halting the movement of said piston when the two pairs of jaws are horizontally spaced apart a second predetermined distance greater than said first predetermined distance.

6. In a machine as recited in claim 5 wherein:

said fluid-actuated piston means comprises means for overcoming said first stop means.

7. In a machine as recited in claim 6 wherein:

said first stop means comprises yieldable means.

8. In a machine as recited in claim 5 wherein said linkage (g) comprises:

a housing;

a piston rod extending between said cylinder and said first pair of jaws, through said housing;

said housing being fixed on said piston rod and having a first end portion facing said first pair of jaws and a second end portion facing said cylinder;

spring means movably mounted within said housing around said piston rod;

said spring means having a first end portion facing said first end portion of the housing and a second end portion facing the housing's second end portion;

a stop element slidably mounted on said piston rod and having a first portion located outside of said housing between the housing and said cylinder and a second portion located within said housing;

said first end portion of the housing comprising means for engaging the first end portion of the spring means;

and said second end portion of the spring means comprising means for engaging the second end portion of said stop element.

9. In a machine as recited in claim 8 wherein:

said spring means is resiliently compressible in the axial direction of said piston rod, between a normally expanded condition and a contracted condition;

said second end portion of the stop element comprises means for engaging the second end portion of the housing when the first end portion of the housing engages the first end portion of the spring means and the second end portion of the spring means engages the second end portion of the stop element;

said first end portion of the stop element comprises means for engaging said cylinder when either end portion of the stop element is in engagement with the second end portion of the housing;

and said second end portion of the housing comprises means for engaging the first end portion of the stop element when both end portions of the spring means are engaged and the spring means is in its contracted position.

10. In a machine as recited in claim 9 wherein:

said spring means normally maintains the second end portion of said housing spaced away from the first end portion of the stop element when the spring means is in its expanded condition.

11. In a machine as recited in claim 10 and comprising:

means including said fluid-actuated piston for overcoming the action of said spring means which maintains the housing's second end portion spaced away from the stop element's first end portion.

12. In a machine as recited in any of claims 9–11 wherein:

said first stop means includes the first end portion on said stop element when it engages said cylinder;

and said second stop means includes the second end portion on said housing when it engages the first end portion of the stop element after the latter has engaged the cylinder.

13. In a machine for butt welding together a pair of horizontally spaced apart, longitudinal edge portions each having a front end and a rear end, said machine including (a) a horizontally disposed, cantilevered horn member having an unsupported front end, (b) a stationary upper jaw located on the bottom of said cantilevered horn member, for engaging the upper surface of one of said edge portions, (c) a lower jaw for engaging the lower surface of said one edge portion and for cooperating with said upper jaw to apply a clamping pressure to said one edge portion, said lower jaw having front and rear ends, (d) a vertically disposed slide member carrying said lower jaw at the top of the slide member, (e) frame means mounting said slide member for vertical movement towards and away from said cantilevered member, and (f) means for urging said slide member in an upward direction to exert an upward force through said lower jaw, the improvement (g) comprising:

adjustable means, located adjacent the bottom of said slide member, for enabling the introduction of bias into the force exerted through said lower jaw, along the dimension thereof between its front and rear ends, to apply a non-uniform clamping pressure along said one edge portion from the front end to the rear end of said one edge portion.

14. In a machine as recited in claim 13 wherein said slide member (d) has front and rear ends corresponding to the front and rear ends of the lower jaw and said adjustable means for enabling the introduction of said bias comprises:

a pair of vertically disposed pads fixed to said slide member and spaced apart in a direction from front to rear of said slide member;

each of said pads having front and rear sides;

means for exerting an adjustable horizontal force in a rearward direction against the front side of one of said pads;

and means for exerting an adjustable horizontal force in a frontward direction against the rear side of the other pad.

15. In a machine as recited in claim 14 wherein:

said first-recited means for exerting an adjustable horizontal force includes a first cam follower engaging one of said pads on the front side thereof;

and said second-recited means for exerting an adjustable horizontal force includes a second cam follower engaging the other of said pads on the rear side thereof.

16. In a machine as recited in claim 15 wherein said means for exerting said adjustable horizontal forces comprises:

a carrier element comprising means for carrying both of said cam followers;

a horizontally disposed adjustment member extending in a direction from front to rear of said slide member;

means mounting said carrier element on said adjustment member;

means mounting said adjustment member for horizontal movement, with said carrier element, in frontward and rearward directions;

first urging means for adjustably urging said adjustment member in a frontward direction;

and second urging means for adjustably urging said adjustment member in a rearward direction.

17. In a machine as recited in claim 16 wherein:

said adjustment member comprises a threaded rod portion;

said mounting means for the adjustment member is fixed relative to vertical movement by said vertically disposed slide member and comprises a vertically disposed part having front and rear surfaces;

said threaded rod portion extends through said vertically disposed part of said fixed mounting means;

said first urging means comprises a first nut located on said threaded rod portion, said first nut comprising means for engaging said rear surface of said vertically disposed part;

and said second urging means comprises a second nut located on said threaded rod portion, said second nut comprising means for engaging said front surface of the vertically disposed part.

18. In a machine as recited in claim 17 and comprising:

a horizontally disposed pin extending in a frontward direction from said carrier element;

means, spaced in a frontward direction from said carrier element, for slidably receiving said pin;

said receiving means being fixed relative to vertical movement by said vertically disposed slide member.

19. In a machine as recited in claim 16 wherein said means for carrying said cam followers comprises:

means mounting said cam followers for rotation about a horizontal axis extending transversely to said adjustment member.

20. In a machine as recited in claim 13 wherein said slide member (d) has front and rear ends corresponding to the front and rear ends of the lower jaw, and wherein:

said frame means includes a mounting member at the front end of said slide member and a mounting member at the rear end of the slide member;

and said machine comprises means, including a clearance between said slide member and each of said mounting members, for enabling said slide member to be tilted off a true vertical disposition, in a frontward or rearward direction, in response to the operation of said adjustable means.

21. In a machine as recited in claim 20 wherein:

said machine comprises means defining a pivotal axis about which said slide member can be tilted;

and said adjustable means comprises means for exerting an adjustable horizontal force against said slide member, below said pivotal axis, in either a frontward or a rearward direction.

22. In a machine as recited in claim 21 wherein:

said clearances are located closer to the top of said slide member than to the bottom thereof;

said adjustable means is located closer to the bottom of said slide member than to the top thereof;

and said pivotal axis extends in a direction transverse to said frontward and rearward directions and is located adjacent one of said mounting members.

23. In a machine as recited in claim 20 wherein (f) said means for urging the slide member in an upward direction comprises:

a movably mounted element actuable to move in a direction having a vertical component;

and a linkage between said movably mounted element and said slide member;

said linkage comprising means for exerting an upward force on said slide member while accommodating the tilt of said slide member off a true vertical disposition.

* * * * *